(12) United States Patent
Schnedler et al.

(10) Patent No.: US 8,126,962 B1
(45) Date of Patent: *Feb. 28, 2012

(54) SYSTEMS AND METHODS FOR TRACKING USER ACTIVITY AT WEBSITE

(75) Inventors: Randal Lane Schnedler, San Antonio, TX (US); Kevin Anthony Kossow, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 211 days.

This patent is subject to a terminal disclaimer.

(21) Appl. No.: 12/270,913

(22) Filed: Nov. 14, 2008

(51) Int. Cl.
*G06F 15/16* (2006.01)

(52) U.S. Cl. ............ 709/203; 709/223; 709/224; 707/3; 715/513

(58) Field of Classification Search .................. 709/203, 709/223, 224; 707/3; 715/513
See application file for complete search history.

(56) References Cited

U.S. PATENT DOCUMENTS

| | | | |
|---|---|---|---|
| 6,704,732 B1 * | 3/2004 | Barclay ................................ 1/1 |
| 7,644,121 B2 * | 1/2010 | Swanson et al. ............. 709/203 |
| 2002/0032677 A1 | 3/2002 | Morgenthaler et al. |
| 2002/0078191 A1 * | 6/2002 | Lorenz ......................... 709/223 |
| 2002/0128925 A1 * | 9/2002 | Angeles .......................... 705/26 |
| 2003/0229849 A1 * | 12/2003 | Wendt ............................ 715/513 |
| 2004/0199487 A1 | 10/2004 | Eio |
| 2007/0124661 A1 | 5/2007 | Hackworth et al. |
| 2007/0255675 A1 | 11/2007 | Fuzell-Casey et al. |
| 2008/0109258 A1 | 5/2008 | Kirschenbaum et al. |
| 2008/0147617 A1 * | 6/2008 | Kumar ............................. 707/3 |
| 2008/0183745 A1 | 7/2008 | Cancel et al. |
| 2008/0195588 A1 | 8/2008 | Kim et al. |
| 2008/0195665 A1 * | 8/2008 | Mason et al. .............. 707/104.1 |
| 2009/0172159 A1 * | 7/2009 | Kocol ........................... 709/224 |

OTHER PUBLICATIONS

Cappelli, Amedeo et al.: "Ontological Knowledge and Language in Modelling Classical Architectonic Structures", Istituto di Scienza e Tecnologie dell'Informazione "A. Faedo", 5 pages.

* cited by examiner

*Primary Examiner* — Thuong Nguyen
(74) *Attorney, Agent, or Firm* — Brooks, Cameron & Huebsch, PLLC

(57) ABSTRACT

A data source generates a requested page for an electronic network site to include inserted tracking parameters to aid in tracking the activities of the user at the site. The site receives the generated page with the inserted tracking parameters and returns to a user the received page as the requested page with the inserted tracking parameters removed therefrom. The site appends the removed tracking parameters to the URL associated with the returned page at the query string thereof, and sends to a tracking database the appended URL. The tracking database stores the sent URL for being accessed by one or more analytical tools to analyze the tracking parameters regarding the activities of the user at the site.

18 Claims, 3 Drawing Sheets

SYSTEMS AND METHODS FOR TRACKING USER ACTIVITY AT WEBSITE

CROSS-REFERENCE TO RELATED APPLICATION(S)

The present application is filed concurrently with and shares a common title and disclosure with the following applications, each of which is hereby incorporated herein by reference in its entirety:
  U.S. patent application Ser. No. 12/270,906; and
  U.S. patent application Ser. No. 12/270,910.

FIELD

The present disclosure is directed to tracking user activity at a web site. In particular, the present disclosure relates to tracking such user activity in instances where a URL (Uniform Resource Locator) associated with each page is not necessarily fully indicative of such user activity.

BACKGROUND

An organization having an electronic information site such as a web site oftentimes may wish to track activities of users at the site. In particular, the organization may wish to create a record representing the presentation of each web page served to each requesting user. Reasons for creating such a record are many and varied, but typically involve: gathering data and other information that may be employed to perform statistical analyses of particular ones of the pages or of the site overall, such as for example regarding effectiveness, usability, perceived user experience, and the like; gathering data and other information that may be employed to establish use profiles of users overall or particular ones of users, such as average viewing time, typical actions performed, perceived preferences, and the like; and gathering data and other information that may be employed to establish technology profiles regarding technological aspects of the site, such as browsers employed to access the site, typical connection speeds, activities performed by servers connected with the site, and the like; among other things. Notably, one particular reason for creating such a record may be to establish proof that a user visited a particular web page or performed a particular action at particular web page, especially if the user may later deny such a visit or such an action, among other things.

One way to track such activity is to obtain the URL (Uniform Resource Locator) of each request from a user and store the obtained URL in an access log. As should be understood, such a URL typically includes a namespace, a hostname, perhaps an extension, and also perhaps a query string as generated at the web site. Thus, in the case of the URL:
  http://www.example.com/search?sourceid=navclient&ie=UTF-8& q=searchstring
'http://' is the namespace, 'www.example.com' is the hostname, '/search' is the extension, and '?sourceid=navclient&ie=UTF-8& q=searchstring' is the query string.

Tracking by way of a URL is generally known as a form of web analytics. In such tracking, each time a page or an image is served by a web server, the web server automatically logs the URL, the IP address, browser type, and operating system of the requesting user, the date and time, the number of bytes, the return code, the referring page, cookies employed, and the like in a log file.

However, and as should be understood, the obtained URL from each request may not contain all the information that the organization wishes to track. For example, although the URL may indeed contain significant information regarding the activity, such URL does not necessarily contain all of the information that is desired by the organization for purposes of tracing activities of the user. Moreover, the query string portion such URL is an optional feature of a URL and is not always present, or if present may not necessarily be informative. Especially if the page associated with the screen is dynamically generated, and as should be understood, the URL can be the same across multiple served pages even where the pages are substantially different, and accordingly such URL can be of little real informative value in such a situation.

In order to augment web logs to capture the dynamic information, page tags have been employed in the prior art. Page tags are essentially references to invisible images with additional query parameters that are embedded in the results sent back to the requesting user. When a browser of such user attempts to resolve the images, the additional information can be added to the log. Page tags can be inserted either on the client side using javascript, or on the server side using servlets. Usually, page tags have a different domain name than the actual pages. This allows the server logs of the page tagging server to be completely dedicated for the purpose of web analytics. This also allows web analytics to be done as a hosted service.

However, in order to maintain insight into the unique source of the request, the page tagging server has to set and read a cookie. Since the domain is different than the encapsulating page, this is known as a third party cookie. Since this third party cookie can be set and read by the owner of the domain (the third party), it can be used by the third party to correlate all the pages across all domains that contain a reference to the third party. For this reason, many people became very averse to third party cookies and have refused to accept them. This causes web analytics results that use page tags to be unreliable.

Web server plug-ins have also been employed in the prior art to augment web logs and inject additional information and correlate first party page tags. However, there is some risk that the plug-in causes additional latency or risk of failure, and accordingly this solution is less than desirable.

Accordingly, a need exists for a method and mechanism by which a user at a site of an organization can be tracked. In particular, a need exists for such a method and mechanism where the query string of the URL of each served page from the organization includes useful tracking information.

SUMMARY

The aforementioned needs are satisfied at least in part by systems and methods with regard to an organization having an electronic network site with which a user interacts with the organization. The systems and methods are employed in connection with tracking activities of the user at the site. At the site, a request is received from the user for a particular page of information, and the site calls to a data source to generate a page in response to the requested URL.

The data source generates the requested page to include a number of tracking parameters inserted thereinto. Each tracking parameter as inserted into the requested page is defined by the organization to aid in tracking the activities of the user at the site by specifying information relating to such tracking, and is identifiable as a tracking parameter. The site receives the generated page from the data source with the number of inserted tracking parameters, and removes each inserted tracking parameter from the received page. Thereafter, the site returns to the user the received page as the requested page with the inserted tracking parameters removed therefrom. The returned page has a URL associated therewith, where the URL includes a query string with a number of site parameters.

The site appends each removed tracking parameter to the URL associated with the returned page at the query string thereof. The query string of the appended URL thereby includes the number of site parameters and the number of tracking parameters. Thereafter, the site sends to a tracking database the appended URL with the query string having the number of site parameters and the number of tracking parameters. The tracking database stores the sent URL for being accessed by one or more analytical tools to analyze the number of site parameters and the number of tracking parameters in the query string of the stored URL regarding the activities of the user at the site.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
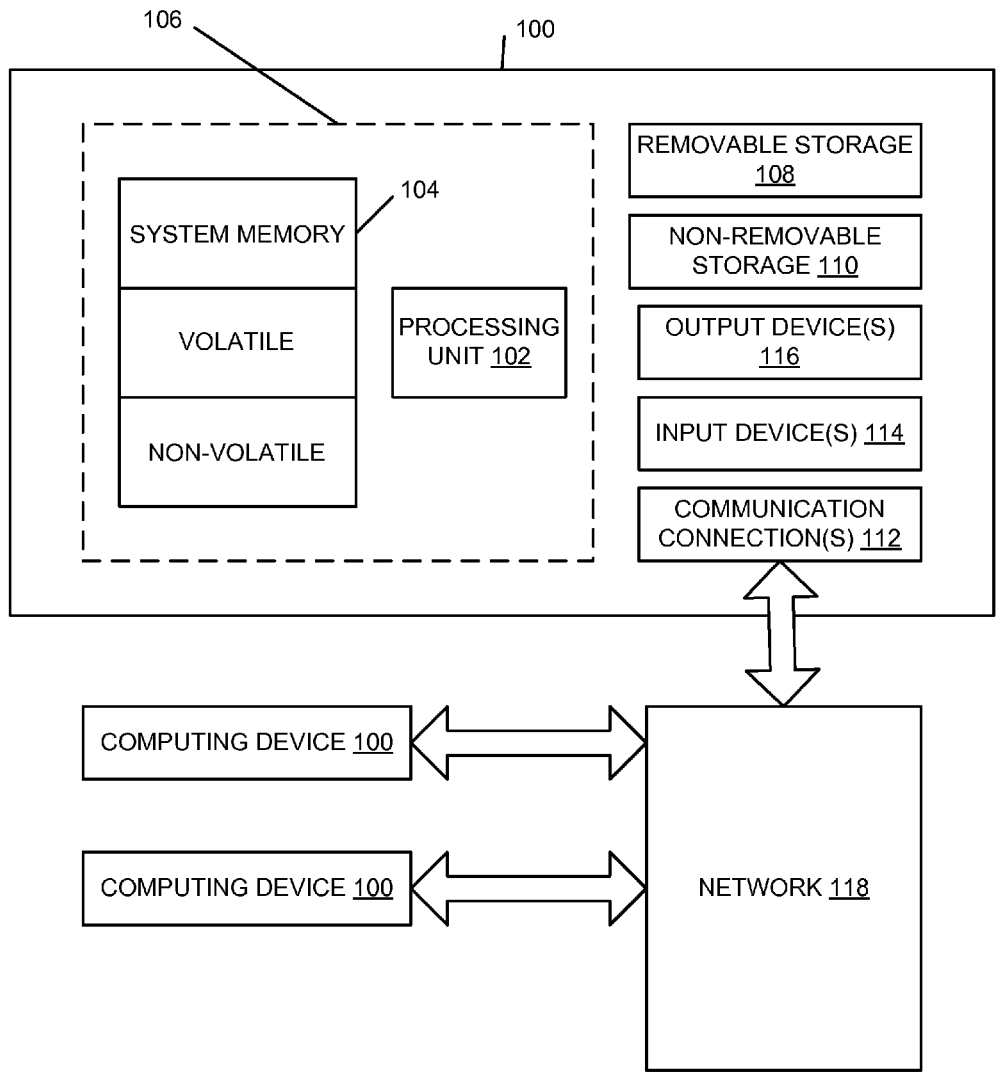
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Tracking User Activity at a Site of an Organization

Figure 2:
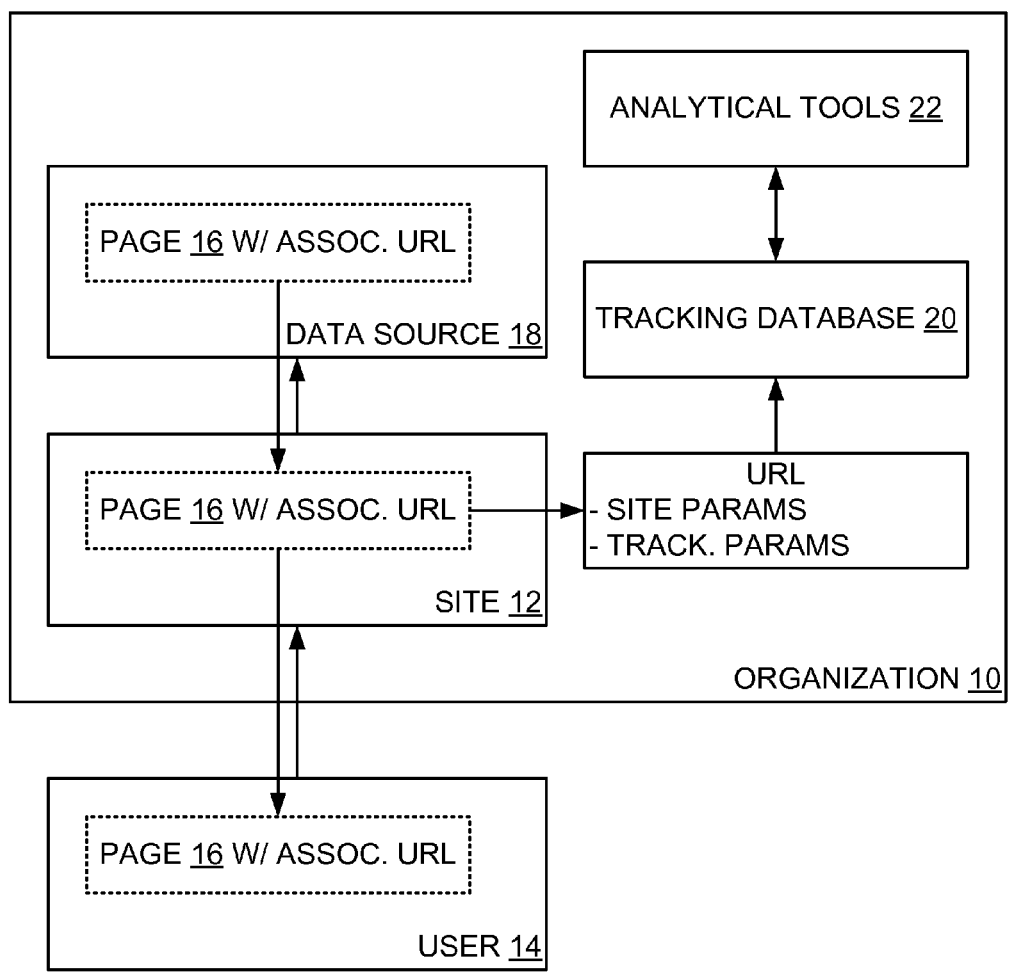
FIG. 2 is a block diagram of a system for tracking activities of a user at a site of an organization in accordance with various embodiments of the present innovation.

In various embodiments of the present innovation, and turning now to FIG. 2, it is seen that an organization 10 offers a web site, electronic network site, or the like (hereinafter 'site 12') by which users 14 may interact with the organization 10, perhaps both to obtain information from the organization 10 and to provide information to the organization 20. As may be appreciated, such organization 10 may be any organization, such as for example a financial institution, a merchant, an information source, a news distributor, or the like. Likewise, the user 14 may be any user, such as for example a customer, a potential customer, a consumer, a casual browser, or the like. Also, a user can be, and often is, another computer system.

The site 12 of the organization 10 may serve any appropriate information to the user 14, typically in the form of a page 16 served in response to each request from each user 14. As is often the case, the site 12 does not itself generate the page 16 with the information, but instead acts as a front-end that obtains such page 16 from a back-end data source 18 of the organization 10 that is responsible for generating such page 16. Notably, and as was pointed out above, the served page 16 has an associated URL (Uniform Resource Locator) that includes a namespace, a hostname, perhaps an extension, and also perhaps a query string as generated at the web site. The query string in particular may include most any terms, usually in a name-attribute pair format, and usually preceded by a '?', Thus, one query string may be:

?sourceid=navclient&ie=UTF-8&
q=searchstring&user=113223

The query string is typically generated by a server at the web site 12 and not by the data source 18 that generated the page 16 served by such site 12, and accordingly the query string includes information more closely aligned with the site 12 and not the data source 18.

As was alluded to above, the organization 10 may wish to track activities of the user 14 at the site 12. In particular, the organization 10 may wish to create a record representing the presentation of each page 16 served to the requesting user. One way to track such activity is to obtain the URL associated with each page 16 served to the user 14 and store the obtained URL in an access log. However, and again, the obtained URL does not necessarily contain information that is particularly useful for tracking activities of the user 14 at the site 12 of the organization 10.

For one thing, and again, the URL need not necessarily have a query string from which information may be gleaned to track the activity of the user 14. For another, the query string is not necessarily unique, and in fact such query string may be identical across multiple served pages 16 from the site 12 even where the pages 16 are substantially different, especially if the pages 16 are dynamically generated. Accordingly, and again, a URL can be of little real informative value with regard to tracking the activities of a user 14 at a site 12 of an organization 10.

Accordingly, and in various embodiments of the present innovation, the query string of a URL associated with a served page 16 includes two portions: one or more site parameters such as are typically included with a URL, and tracking parameters generated by the data source 18 or other sources. Typically, but not necessarily, the tracking parameters follow the site parameters and are separated therefrom by a delimiting character such as '#'. As before, each parameter in the query string may be in the form of a name-attribute pair.

In various embodiments of the present innovation, the tracking parameters for the URL associated with a page 16 are generated by the data source 18 that generates the page 16, are inserted into the generated page 16 as returned to the site 12 in response to a request therefrom, are stripped out or otherwise removed from the returned page 16 by the site 12, and then are appended to the query string of the URL associated with the page 16 as delivered to the requesting user 14. Thus, the data source 18 may be programmed to add any tracking parameters deemed necessary and/or appropriate that may at some later point be useful in tracking the activities of the user 14 at the site 12 of the organization 10.

Figure 3:
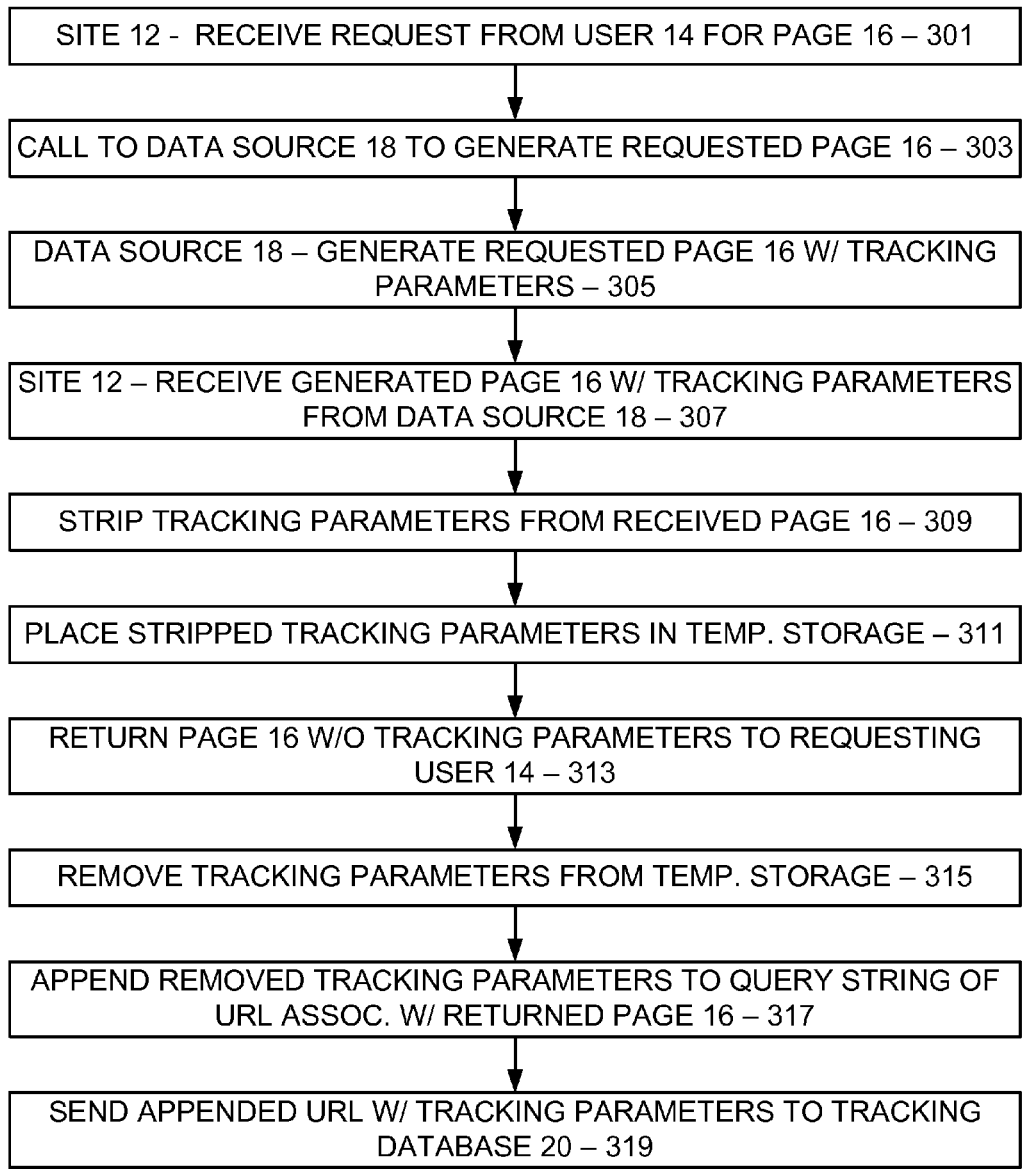
FIG. 3 is a flow diagram showing key actions performed in connection with the system of FIG. 2 in accordance with various embodiments of the present innovation.

More particularly, and turning now to FIG. 3, it is seen that the site 12 of the organization 10 receives a request from a user 14 for a particular page 16 of information (301). As may be appreciated, the site 12 does not itself generate the requested page 16. Instead, the site 12 calls to the data source 18 to generate the requested page 16 (303), and the data source 18 indeed generates the requested page 16 to include a number of tracking parameters (305). Such a call to such a data source 18 and such a data source 18 generating the requested page 16 are generally known or should be apparent to the relevant public, and therefore need not be set forth herein in any detail other than that which is provided. Accordingly, the call and the generating may be performed in any appropriate manner.

Notably, the data source 18 oftentimes generates the page 16 in an XML (Extensible Markup Language) format, although other formats may also be employed. With such an XML format or the like, which is generally hierarchically organized, generating the requested page 16 with one or more inserted tracking parameters is merely a matter of the data source 18 employing programming that adds each tracking parameter as an additional branch of code at an appropriate hierarchical location, as is generally known. Accordingly, it is to be understood that the added tracking parameters are ultimately defined by the programming employed by the data source 18 to generate each requested page 16

Each added tracking parameter as should be understood is intended to help the organization 10 track the activities of the user 14 at the site 12 of such organization 10 and thus may be defined in accordance with such a goal, although the added tracking parameter may in fact be defined to be almost any parameter. Thus, a tracking parameter may define an identification of the requesting user 14, a time at which the requested page 16 is generated, a server or other generator that generated the requested page 16, a source of information that appears in the requested page 16, a reference to another location at which related information was or may be obtained, a reference to a related generated page 16, and/or an identification of an account of the user 14 at the organization 10, among many other things. Some example sources of tracking parameters include, but are not limited to: attributes of the user's web session, the web application that handles the page request, personalization attributes, the user's browser, and current network information. Also, some example user activities include but are not limited to: NB testing as personalized by the site, account type chosen by the user (on current request or a previous page request), the user's current authentication status, and authorization parameters.

Each tracking parameter as generated within a requested page 16 may take a form appropriate to the content within which such tracking parameter appears and/or to the system that generated such content, as should be generally appreciated. For example, if the requested page 16 includes content generated by a Web Content Management (WCM) system, the tracking parameter may appear as:
<TrackingParameter name="myName" value="myValue"/>,
<TrackingParameter name="myName" value="myValue">.
. . </TrackingParameter>,
or the like. Similarly, if the requested page 16 includes content generated in a Java Server Page (JSP), the tracking parameter may appear as:
<inf_presutils:TrackingParameter name="myName" value="myValue"/>,
<inf_presutils:TrackingParameter name="myName" value="myValue"> . . . </inf_presutils:TrackingParameter>
or the like.

Note that WCM and JSP are two examples of systems that generate pages 16 dynamically. As should be understood, other systems and functionality employed at the data source 18 may not themselves generate pages 16 but instead may generate information to be incorporated into pages 16. For example, a Java application is but one example of an application that generates such information. In connection with the Java application and the like, then, it is to be understood that tracking parameters may be incorporated into information generated thereby by specifying one or more defined Java classes from which tracking parameters may be instantiated in such information. To specify a tracking parameter from anywhere in Java during the processing of an HTTP request for a page 16 from a user 14, then, the code employed in a Java application may appear as:
TrackingParameters.addParameter("myName", "myValue"),
or the like. In all of the above examples, it is to be appreciated that 'myName' is the name portion of a name-attribute pair representing a particular tracking parameter, and 'myValue' is the attribute portion of the name-attribute pair representing the particular tracking parameter.

As should now be appreciated, and returning to FIG. 3, the site 12 acting as a front-end receives the generated page 16 from the data source 18 (307), where the received page 16 has one or more tracking parameters embedded therein. Thereafter, the site 12 strips out or otherwise removes each tracking parameter from the received page 16 (309) and places the stripped tracking parameter in a temporary storage for the received page 16 such as a queue or the like (311). Note here that the site 12/front-end may add tracking parameters on its own to the temporary storage for the received page 16 if it is deemed necessary and/or advisable.

Once all tracking parameters are stripped from the received page 16 and queued, the site 12/front-end returns the page 16 without the tracking parameters therein to the requesting user 14 as a response to the received request of 301 (313). Note here that the site 14 may alternately include the tracking parameters with the returned page 16, although the returned page 16 does not require such tracking parameters. Perhaps more significantly, such tracking parameters may not be understood within the returned page 16 and therefore are to be removed therefrom. Also, such tracking parameters may contain information that the organization 10 wishes to maintain as confidential, and likewise are to be removed from the returned page 16.

Upon returning the page 16 as at 313, the site 12 typically performs any clean-up functions that are deemed advisable, including in this case removing the tracking parameters from the temporary storage for the returned page 16 (315).

As was pointed out above, the tracking parameters as removed from the temporary storage or the like are then appended to the query string of the URL associated with the returned page 16 (317), so that the query string includes one or more site parameters such as are typically included with a URL, and the tracking parameters generated by the data source 18 or other sources, perhaps separated by a delimiting character such as '#'. Note here that such URL appended with tracking parameters is not typically returned to the requesting user 14. Instead, such appended URL with tracking parameters is sent to a tracking database 20 (FIG. 2) for storage therein (319).

Such a tracking database 20 may be organized in any appropriate manner, and is generally known. As may be appreciated, the tracking database 20 is accessed by one or more analytical tools 22 (FIG. 2), which are also generally known, to analyze the parameters stored therein, including each tracking parameter and also each site parameter of each URL. Such analysis may be any appropriate analysis, such as for example to identify trends that require further attention by the organization 10. As may be appreciated, based thereon, the analytical tool 22 may organize the parameters according to another database (not shown), especially if the amount of data in the tracking database 20 is especially large.

Such tracking database 20 may also be accessed by one or more analytical tools 22 to identify particular URLs associated with a particular requesting user 14 at a particular time. As may be appreciated, such identification may be performed in any appropriate manner and for any appropriate reason, such as for example to identify that the user 14 did or did not in fact perform a particular transaction, or to identify that the user 14 was in fact accessing the site 12 at a particular time, among other things.

A single request for a page 16 from a user 14 to a site 12 of an organization 10 may generate any number of tracking parameters. In doing so, it may be that case that some of the generated tracking parameters may have identical names. In various embodiments, such identical names are allowable, while in other embodiments, such identical names are not permitted. In the latter case, where a tracking parameter is named more than once during a request, only the last one defined will be recorded in the tracking database 20.

Although the application infrastructure allows for arbitrary names of tracking parameters, it is to be appreciated that processing of each tracking parameter requires such parameter to be identifiable by the analytical tools 22. Thus, each tracking parameter in the system must be coordinated to be both generated by the data source 18 and consumed by the analytical tools 22. More broadly speaking, tracking parameters in the present system are introduced into the system in a planned manner and not an ad hoc manner.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a method and mechanism are provided by which a user 14 at a site 12 of an organization 10 can be tracked. In particular, the query string of the URL of each page 16 served to the user 14 is stored to include site parameters that would normally be generated by the site 12 as well as tracking parameters generated by the data source 18 that generated the page 16. Each tracking parameter may be any appropriate tracking parameter that is believed to be useful in tracking the activities of the user 14 at the site 12 of the organization 10.

It should be appreciated that changes could be made to the embodiments described above without departing from the innovative concepts thereof. For example, although the present innovation is set forth primarily in terms of tracking parameters generated by a data source 18 that generates a page 16, such tracking parameters may generated by other sources including the site 12 itself, the tracking database 20, the analytical tool 22, or the like.

Likewise, although the present innovation is set forth primarily in terms of filling and emptying a temporary storage with the tracking parameters for a page 16, another mechanism may be employed to gather the tracking parameters for the page 16, such as for example transferring each tracking parameter directly to the URL that is to be stored in the tracking database 20. It should be understood, therefore, that this innovation is not limited to the particular embodiments disclosed, but it is intended to cover modifications within the spirit and scope of the present innovation as defined by the appended claims.

The invention claimed is:

1. A method performed with regard to an organization having an electronic network site with which a user interacts with the organization, the method for tracking activities of the user at the site, comprising:

receiving, at the site, a request from the user for a particular page of information;

calling, from the site to a data source, to generate the requested page;

generating, at the data source, the requested page to include a number of tracking parameters inserted thereinto, each tracking parameter as inserted into the requested page being defined by the organization to aid in tracking the activities of the user at the site by specifying information relating to such tracking, and being identifiable as a tracking parameter;

receiving, at the site from the data source, the generated page with the number of inserted tracking parameters;

removing, at the site, each inserted tracking parameter from the received page and placing each removed tracking parameter in a temporary storage queue;

returning, from the site to the user, the received page as the requested page with the inserted tracking parameters removed therefrom, the returned page having a URL associated therewith, the URL including a query string with a number of site parameters;

retrieving each removed tracking parameter from the temporary storage queue' appending, at the site, each removed tracking parameter retrieved from the temporary storage queue to the URL associated with the returned page at the query string thereof, the query string of the appended URL thereby including the number of site parameters and the number of tracking parameters;

sending, from the site to a tracking database, the appended URL with the query string having the number of site parameters and {he number of tracking parameters;

storing, at the tracking database, the sent URL for being accessed by one or more analytical tools to analyze the number of site parameters and the number of tracking parameters in the query string of the stored URL regarding the activities of the user at the site; and wherein the inserted tracking parameters is generated at the data source by a Java Server Page (JSP) system.

2. The method of claim 1 wherein each removed tracking parameter is placed in a temporary storage and the removed tracking parameters in the temporary storage are retrieved to be appended to the URL.

3. The method of claim 1 wherein the tracking parameters appear in the query string of the appended URL after the site parameters and separated therefrom by a delimiting character.

4. The method of claim 1 wherein each tracking parameter in any stored URL has a unique name as compared to any other tracking parameter in the stored URL.

5. The method of claim 1 wherein at least one of the inserted tracking parameters is generated at the data source by a Web Content Management (WCM) system.

6. The method of claim 1 wherein at least one of the inserted tracking parameters is generated at the data source by a Java application according to code specifying a defined Java class.

7. A non-transitory computer-readable storage medium having computer-executable instructions stored thereon implementing a method performed with regard to an organization having an electronic network site with which a user interacts with the organization, the computer-executable instructions being executed by a processor to:

receive, at the site, a request from the user for a particular page of information;

call, from the site to a data source, to generate the requested page;

generate, at the data source, the requested page to include a number of tracking parameters inserted thereinto, each tracking parameter as inserted into the requested page being defined by the organization to aid in tracking the activities of the user at the site by specifying information relating to such tracking, and being identifiable as a tracking parameter;

receive, at the site from the data source, the generated page with the number of inserted tracking parameters;

remove, at the site, each inserted tracking parameter from the received page and place each removed tracking parameter in a temporary storage queue;

return, from the site to the user, the received page as the requested page with the inserted tracking parameters removed therefrom, the returned page having a URL associated therewith, the URL including a query string with a number of site parameters;

retrieve each removed tracking parameter from the temporary storage queue;

append, at the site, each removed tracking parameter retrieved from the temporary storage queue to the URL associated with the returned page at the query string thereof, the query string of the appended URL thereby including the number of site parameters and the number of tracking parameters;

send, from the site to a tracking database, the appended URL with the query string having the number of site parameters and the number of tracking parameters;

store, at the tracking database, the sent URL for being accessed by one or more analytical tools to analyze the number of site parameters and the number of tracking parameters in the query string of/he stored URL regarding the activities of the user at the site; and wherein the inserted tracking parameters is generated at the data source by a Java Server Page (JSP) system.

8. The medium of claim 7 wherein each removed tracking parameter is placed in a temporary storage and the removed tracking parameters in the temporary storage are retrieved to be appended to the URL.

9. The medium of claim 7 wherein the tracking parameters appear in the query string of the appended URL after the site parameters and separated therefrom by a delimiting character.

10. The medium of claim 7 wherein each tracking parameter in any stored URL has a unique name as compared to any other tracking parameter in the stored URL.

11. The medium of claim 7 wherein at least one of the inserted tracking parameters is generated at the data source by a Web Content Management (WCM) system.

12. The medium of claim 7 wherein at least one of the inserted tracking parameters is generated at the data source by a Java application according to code specifying a defined Java class.

13. A system of an organization, having an electronic network site with-which a user interacts with the organization, the system for tracking activities of the user at the site, comprising:

a subsystem including a processor and a memory communicatively coupled with the processor, the subsystem configured to:

receive, at the site, a request from the user for a particular page of information;

call, from the site to a data source, to generate the requested page;

generate, at the data source, the requested page to include a number of tracking parameters inserted thereinto, each tracking parameter as inserted into the requested page being defined by the organization to aid in tracking the activities of the user at the site by specifying information relating to such tracking, and being identifiable as a tracking parameter;

receive, at the site from the data source, the generated page with the number of inserted tracking parameters;

remove, at the site, each inserted tracking parameter from the received page and place each removed tracking parameter in a temporary storage queue;

return, from the site to the use1, the received page as the requested page with the inserted tracking parameters removed therefrom, the returned page having a URL associated therewith, the URL including a query string with a number of site parameters;

retrieve each removed tracking parameter from the temporary storage queue;

append, at the site, each removed tracking parameter retrieved from the temporary storage queue to the URL associated with the returned page at the query string thereof, the query string of the appended URL thereby including the number of site pm append, at the site, each removed tracking parameter retrieved from the temporary storage queue to the URL associated with the returned page at the query string thereof, the query string of the appended URL thereby including the number of site parameters and the number of tracking parameters;

send, from the site to a tracking database, the appended URL with the query string having the number of site parameters and the number of tracking parameters;

store, at the tracking database, the sent URL for being accessed by one or more analytical tools to analyze the number of site parameters and the number of tracking parameters in the query string of the stored URL regarding the activities of the user at the site; and wherein the inserted tracking parameters is generated at the data source by a Java Server Page (JSP) system.

14. The system of claim 13 wherein each removed tracking parameter is placed in a temporary storage and the removed tracking parameters in the temporary storage are retrieved to be appended to the URL.

15. The system of claim 13 wherein the tracking parameters appear in the query string of the appended URL after the site parameters and separated therefrom by a delimiting character.

16. The system of claim 13 wherein each tracking parameter in any stored URL has a unique name as compared to any other tracking parameter in the stored URL.

17. The system of claim 13 wherein at least one of the inserted tracking parameters is generated at the data source by a Web Content Management (WCM) system.

18. The system of claim 13 wherein at least one of the inserted tracking parameters is generated at the data source by a Java application according to code specifying a defined Java class of the form.

* * * * *